United States Patent
Li et al.

(10) Patent No.: US 10,127,050 B2
(45) Date of Patent: Nov. 13, 2018

(54) EFFICIENT BOOTING SYSTEM

(71) Applicant: International Business Machines Corporation, Armonk, NY (US)

(72) Inventors: Yufei Li, Shanghai (CN); Mengze Liao, Shanghai (CN); Jian Tang, Shanghai (CN); Jiang Yu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/898,911

(22) Filed: Feb. 19, 2018

(65) Prior Publication Data
US 2018/0150303 A1    May 31, 2018

Related U.S. Application Data

(63) Continuation of application No. 15/352,619, filed on Nov. 16, 2016.

(51) Int. Cl.
| | |
|---|---|
| *G06F 9/00* | (2006.01) |
| *G06F 9/4401* | (2018.01) |
| *G06F 9/445* | (2018.01) |
| *G06F 9/44* | (2018.01) |

(52) U.S. Cl.
CPC .......... *G06F 9/4406* (2013.01); *G06F 9/4401* (2013.01); *G06F 9/445* (2013.01); *G06F 9/44* (2013.01); *G06F 9/4411* (2013.01)

(58) Field of Classification Search
None
See application file for complete search history.

(56) References Cited

U.S. PATENT DOCUMENTS

| | | | |
|---|---|---|---|
| 2007/0022281 A1* | 1/2007 | Haustein | G06F 11/1417 713/1 |
| 2007/0094489 A1* | 4/2007 | Ota | G06F 9/4401 713/2 |
| 2009/0132797 A1* | 5/2009 | Lo | G06F 9/4416 713/2 |
| 2011/0055540 A1 | 3/2011 | Lin et al. | |

(Continued)

FOREIGN PATENT DOCUMENTS

| | | |
|---|---|---|
| CN | 105224466 A | 1/2016 |
| CN | 105468362 A | 4/2016 |
| WO | 2015126292 A1 | 8/2015 |

OTHER PUBLICATIONS

Minnich et al., "U-root: A Go-based, Firmware Embeddable Root File System with On-demand Compilation", 2015 USENIX Annual Technical Conference Jul. 8-10, 2015, USENIX Association, ISBN 978-1-931971-225, 11 pages, <https://www.usenix.org/conference/atc15/technical-session/presentation/minnich>.

(Continued)

*Primary Examiner* — Tanh Nguyen
(74) *Attorney, Agent, or Firm* — Peter J. Hackmann

(57) ABSTRACT

An approach for efficient booting. The approach loads a firmware into a memory from one or more integrated memories, wherein the one or more integrated memories are flash memories on a motherboard. The approach loads an operating system into the memory from the one or more integrated memories. Responsive to loading the operating system into the memory, the approach mounts one or more root filesystems.

1 Claim, 4 Drawing Sheets

(56) References Cited

U.S. PATENT DOCUMENTS

2012/0331280 A1* 12/2012 Lin ................. G06F 9/4401
                                                    713/2
2014/0181499 A1   6/2014 Glod
2014/0215199 A1   7/2014 Ma et al.
2016/0188430 A1*  6/2016 Nitta ................ G06F 8/65
                                                    714/6.3
2018/0150303 A1*  5/2018 Li ................... G06F 9/4406

OTHER PUBLICATIONS

Appendix P List of IBM Applications or Patents Treated as Related dated Feb. 16, 2018. Two pages.
Li et al. Original U.S. Appl. No. 15/352,619, filed Nov. 16, 2016.

* cited by examiner

EFFICIENT BOOTING SYSTEM

BACKGROUND OF THE INVENTION

The present invention relates generally to the field of booting processes, and more particularly to firmware and operating system configurations.

Booting, or bootstrap loading, is the process of initializing a computer. Responsive to a computer powering on, a program is loaded into main memory from persistent memory. The program then initializes the hardware components of the computer, initializes any peripheral devices, and loads an operating system into main memory.

SUMMARY

Aspects of an embodiment of the present invention disclose a method, computer program product, and a computer system for efficient booting. The method may include loading, by one or more computer processors, a firmware into a memory from one or more integrated memories, wherein the one or more integrated memories are flash memories on a motherboard. The method may further include loading, by the one or more computer processors, an operating system into the memory from the one or more integrated memories. Responsive to loading the operating system into the memory, the method may further include mounting, by the one or more computer processors, one or more root filesystems.

DETAILED DESCRIPTION

Embodiments of the present invention recognize that booting a computer system can require a significant amount of time. Upon power-on of a computer system, firmware loads a boot loader, then the boot loader loads a kernel of an operating system, then the kernel loads other components of the operating system. Embodiments of the present invention recognize that an operating system must be installed on each computer system after a storage system has been installed.

Embodiments of the present invention provide the capability to boot a computer system more efficiently. Embodiments of the present invention provide the capability to install an operating system on a computer system, independent of an installed storage system. Embodiments of the present invention provide the capability to configure a computer system by simply connecting a storage system without further configuration by a user. Embodiments of the present invention enhance security of a computer system by preventing alteration of an operating system without a specialized update program. Embodiments of the present invention provide the capability to boot a computer system in a read-only mode without connecting a persistent storage system.

Implementation of embodiments of the invention may take a variety of forms, and exemplary implementation details are discussed subsequently with reference to the Figures. The present invention will now be described in detail with reference to the Figures.

Figure 1:
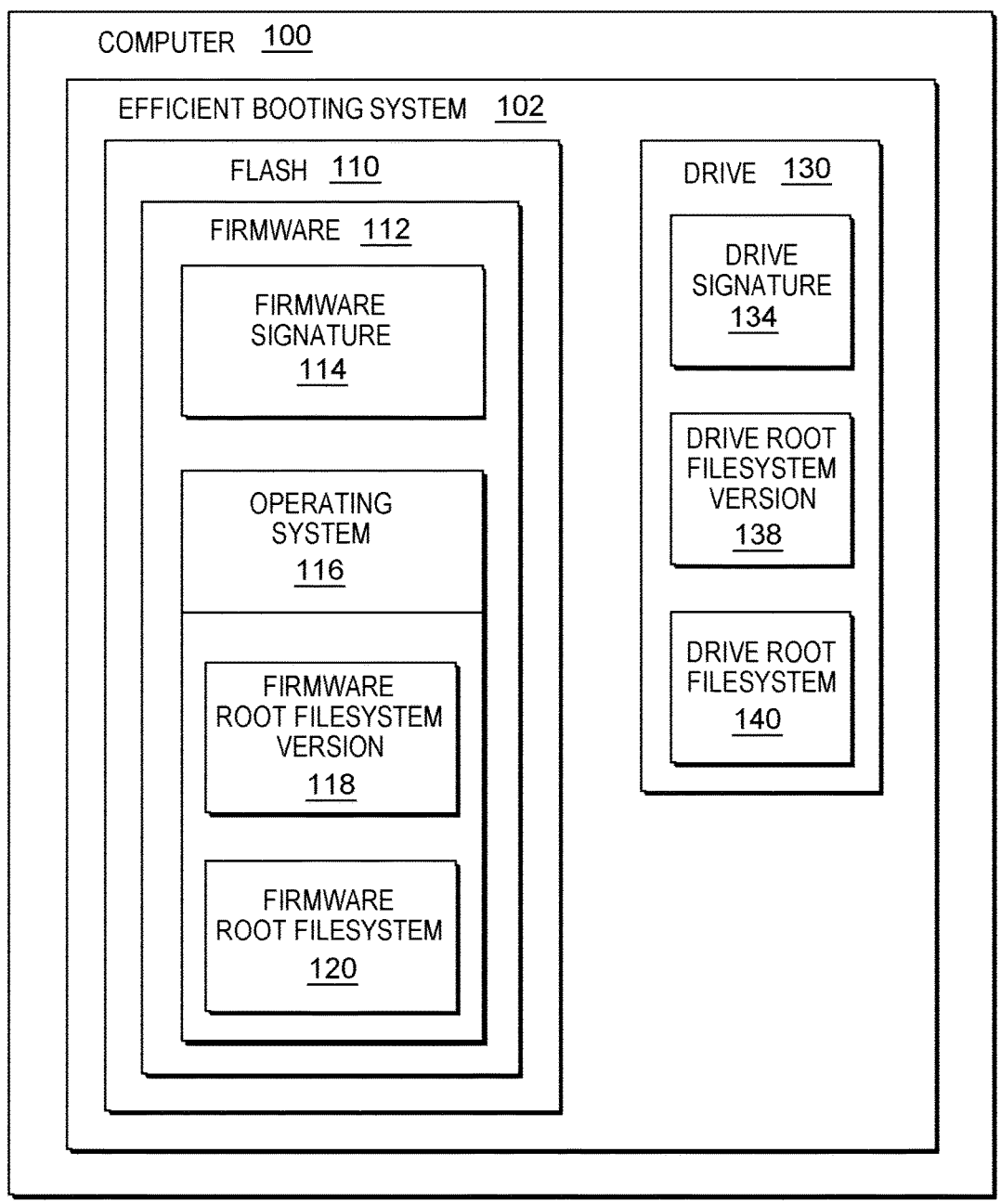
FIG. 1 is a functional block diagram illustrating an efficient booting system on a computer, in accordance with an embodiment of the present invention.

FIG. 1 is a functional block diagram illustrating efficient booting system 102 on computer 100 in accordance with some embodiments of the present invention. FIG. 1 provides only an illustration of one implementation and does not imply any limitations with regard to the environments in which different embodiments may be implemented. Many modifications to the depicted system may be made by those skilled in the art without departing from the scope of the invention as recited by the claims.

Computer 100 may be a computerized system capable of implementing efficient booting system 102. In some embodiments, computer 100 may contain efficient booting system 102.

Efficient booting system 102 may be implemented on computer 100. Responsive to computer 100 powering on, efficient booting system 102 may initialize computer 100. In some embodiments, efficient booting system 102 may contain flash 110 and drive 130. The operations performed by efficient booting system 102 are discussed further in the description of FIG. 2.

Flash 110 may be any suitable type of non-volatile computer-readable storage medium which can retain and store instructions for use by an instruction execution device, such as a central processing unit (CPU). For example, flash 110 may be a flash memory microchip integrated into a motherboard of a computer system. In some embodiments, flash 110 may be read-only memory (ROM) during general operation but may be rewritten by specialized software. In some embodiments, flash 110 may contain firmware 112.

Firmware 112 may be permanent software programmed into a read-only memory that provides control, monitoring, and data manipulation of other components of a computer system. For example, firmware 112 may control hardware components of a computer system, such as a CPU, memory, or a storage drive. In some embodiments, firmware 112 may interpret signals between software and hardware components of a computer system. For example, firmware 112 may receive instructions from software and relay those instructions to a hardware component, such as a CPU. In other embodiments, firmware 112 may utilize a firmware interface to exchange information between firmware 112 and an operating system. For example, firmware 112 may utilize a Unified Extensible Firmware Interface (UEFI) to exchange information with operating system 116. In some embodiments, firmware 112 may include firmware signature 114 and operating system 116.

Firmware signature 114 may identify a storage device to differentiate the storage device from other storage devices. For example, firmware signature 114 may be a unique hexadecimal value stored on flash 110, which distinguishes flash 110 from drive 130. In some embodiments, firmware signature 114 may be paired with a drive signature, such as drive signature 134, to authenticate the contents of a drive, such as drive 130. In some embodiments, firmware signature 114 may be a cryptographic key. For example, firmware signature 114 may be a cryptographic key used to authenticate, encrypt, or decrypt the contents of a connected drive, such as drive 130.

Operating system 116 may be system software which manages computer hardware and software resources and provides services for computer programs. For example, operating system 116 may allocate resources, such as a CPU and memory, to software and manage input/output requests from software. In some embodiments, operating system 116 may include a kernel, which manages and connects software with hardware. For example, the kernel may receive instruction from software, translate the instructions, and provide the instructions to a CPU. In other embodiments, operating system 116 may contain additional software programs, which perform various functions, such as installing user applications and controlling network access. In some embodiments, operating system 116 may contain firmware root filesystem version 118 and firmware root filesystem 120.

Firmware root filesystem version 118 may be a software version number to differentiate the installed software state from previous or updated software states. For example, firmware root filesystem version 118 may be a data value representing software version "1.15.1". In some embodiments, firmware root filesystem version 118 may correspond with drive root filesystem version 138. For example, firmware root filesystem version 118 and drive root filesystem version 138 may both be data values representing software version "1.15.1".

Firmware root filesystem 120 may be software that controls how data is stored. For example, firmware root filesystem 120 may be software which logically organizes and controls how data is stored on flash 110 and drive 130. In some embodiments, firmware root filesystem 120 may control subordinate filesystems, which are logically attached to firmware root filesystem 120.

Drive 130 may be any suitable type of non-volatile computer-readable storage medium and can be a tangible device that retains and stores instructions for use by an instruction execution device. For example, drive 130 may be a hard disk drive or solid state drive, providing non-volatile, persistent storage. In some embodiments, drive 130 may be an array of multiple disk devices, such as a redundant array of independent disks (RAID). In some embodiments, drive 130 may include drive signature 134, drive root filesystem version 138, and drive root filesystem 140.

Drive signature 134 may identify a storage device to differentiate the storage device from other storage devices. For example, drive signature 134 may be a unique hexadecimal value stored on drive 130, which distinguishes drive 130 from flash 110. In some embodiments, drive signature 134 may be paired with a firmware signature, such as firmware signature 114. In some embodiments, drive signature 134 may be a cryptographic key. For example, drive signature 134 and firmware signature 114 may comprise a cryptographic key pair, which can be used to encrypt and decrypt drive 130.

Drive root filesystem version 138 may be a software version number to differentiate the installed software state from previous or updated software states. For example, drive root filesystem version 138 may be a data value representing software version "1.15.1". In some embodiments, drive root filesystem version 138 may correspond with a firmware root filesystem version, such as firmware root filesystem version 118. For example, drive root filesystem version 138 and firmware root filesystem version 118 may contain the same value, such as a data value representing "1.15.1". In other embodiments, where drive root filesystem version 138 does not correspond with a firmware root filesystem, the firmware root filesystem may function as a primary root filesystem. For example, where drive root filesystem version 138 contains a different value than firmware root filesystem version 118, firmware root filesystem 120 may control how data is stored on drive 130, as the primary root filesystem.

Drive root filesystem 140 may be software that controls how data is stored. For example, drive root filesystem 140 may be software which logically organizes and controls how data is stored on drive 130. In some embodiments, drive root filesystem 140 may control subordinate filesystems, which are logically attached to drive root filesystem 140.

In some embodiments, an operating system may store data on a drive via drive root filesystem 140. For example, operating system 116 may store software applications, updates, and installation files on drive 130 and add the storage location of software applications, updates, and installation files to a folder in drive root filesystem 140.

In some embodiments, drive root filesystem 140 may be a primary root filesystem, and a firmware root filesystem may be a secondary root filesystem. For example, where a file is stored in both drive root filesystem 140 and in firmware root filesystem 120, drive root filesystem 140, as the primary root filesystem, may control the manner in which the file is accessed. In another example, where a file is stored only in firmware root filesystem 120, firmware root filesystem 120 may control the manner in which the file is accessed.

Figure 2:
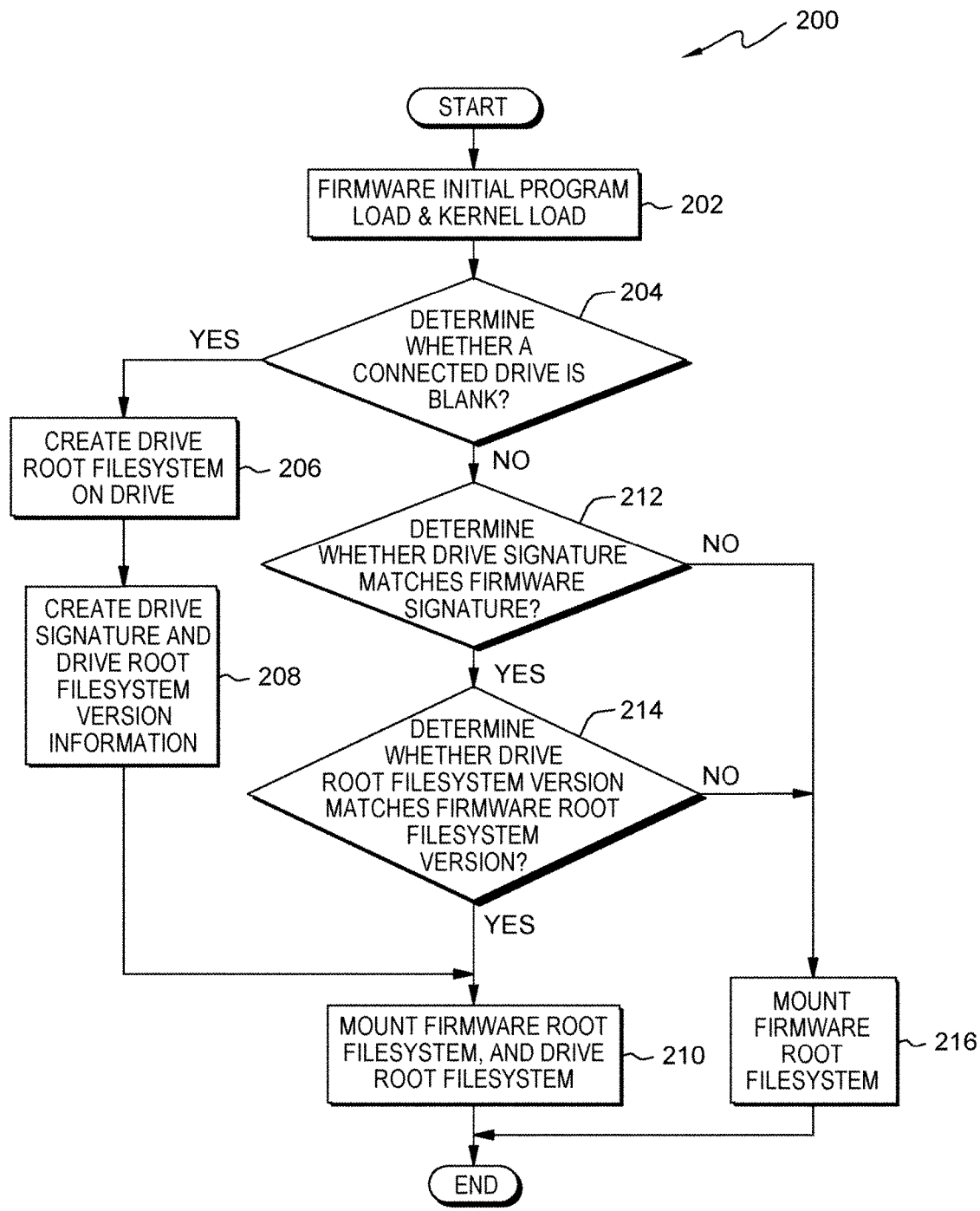
FIG. 2 is a flowchart depicting operational steps of an efficient booting system, such as the efficient booting system of FIG. 1, in accordance with an embodiment of the present invention.

FIG. 2 is a flowchart, generally designated 200, depicting operational steps of efficient booting system 102 within computer 100 of FIG. 1, in accordance with some embodiments of the present invention. The operational steps are in an order according to some embodiments. In other embodiments, the functions noted in the flowchart can occur out of the order noted in FIG. 2. Modifications to the depicted order may be made by those skilled in the art without departing from the scope of the invention as recited by the claims.

Responsive to power-on, efficient booting system 102 executes an initial program load (IPL) and kernel load (202). Efficient booting system 102 may execute an IPL and kernel load by loading programs into memory. For example, efficient booting system 102 may load firmware 112 and a kernel of operating system 116 into random-access memory (RAM) from flash 110.

In some embodiments, efficient booting system 102 may perform a power-on self-test (POST) to determine whether connected hardware components are functioning properly. In some embodiments, efficient booting system 102 may load an operating system from a flash as read-only responsive to detecting that a drive is not connected. For example, efficient booting system 102 may load operating system 116 into memory from flash 110 in a read-only state upon detecting that drive 130 is not connected.

Efficient booting system 102 determines whether a connected drive is blank (204). Efficient booting system 102 may determine whether a blank drive is connected by detecting whether data is contained on the connected drive. For example, efficient booting system 102 may search for a filesystem on a connected drive, and efficient booting system 102 may determine that the connected drive is not blank upon detecting a filesystem on the connected drive.

Responsive to a determination that a connected drive is blank ("YES" branch 204), efficient booting system 102 creates a drive root filesystem on the connected drive (206). Efficient booting system 102 may create a drive root filesystem on the connected drive by writing software data to the connected drive. For example, efficient booting system 102 may create drive root filesystem 140 on drive 130.

Efficient booting system 102 creates drive signature and drive root filesystem version information on the connected drive (208). Efficient booting system 102 may create drive signature and drive root filesystem version information by writing signature and version data to the connected drive. For example, efficient booting system 102 may create drive signature 134 and drive root filesystem version 138 on drive 130.

Efficient booting system 102 mounts the firmware root filesystem and drive root filesystem (210). Efficient booting system 102 may mount the root filesystems by instructing an operating system that the filesystems are ready for use. For example, efficient booting system 102 may make firmware root filesystem 120 and drive root filesystem 140 accessible to operating system 116, and efficient booting system 102 may instruct operating system 116 that firmware root filesystem 120 and drive root filesystem 140 are available for data storage, and efficient booting system 102 ends.

Responsive to a determination that a connected drive is not blank ("NO" branch 204), efficient booting system 102 determines whether the drive signature matches the firmware signature (212). Efficient booting system 102 may determine whether the drive signature, such as drive signature 134, matches the firmware signature, such as firmware signature 114, by comparing drive signature 134 with firmware signature 114. Where drive signature 134 contains a value corresponding to the value contained in firmware signature 114, efficient booting system 102 may determine that drive signature 134 matches firmware signature 114. In some embodiments, efficient booting system 102 may determine whether a hash function of drive signature 134 matches a hash function of firmware signature 114. For example, efficient booting system 102 may apply a hash function to the data contained in firmware signature 114 and drive signature 134, and efficient booting system 102 may determine whether the result of applying the hash function to drive signature 134 matches the result of applying the hash function to firmware signature 114.

Responsive to a determination that the drive signature matches the firmware signature ("YES" branch 212), efficient booting system 102 determines whether the drive root filesystem version matches the firmware root filesystem version (214). Efficient booting system 102 may determine whether the drive root filesystem version matches the firmware root filesystem version by comparing drive root filesystem version 138 with firmware root filesystem version 118. Having determined that drive root filesystem version 138 contains a value equal to the value of firmware root filesystem version 118, efficient booting system 102 may determine that drive root filesystem version 138 matches firmware root filesystem version 118.

Responsive to a determination that the drive root filesystem version matches the firmware root filesystem ("YES" branch 214), efficient booting system 102 mounts the firmware root filesystem and drive root filesystem (210), as described above.

Responsive to a determination that the drive signature does not match the firmware signature ("NO" branch 212), efficient booting system 102 mounts the firmware root filesystem (216). Efficient booting system 102 may mount the firmware root filesystem by instructing an operating system that the filesystem is ready for use. For example, efficient booting system 102 may instruct operating system 116 that firmware root filesystem 120 is ready for use, and efficient booting system 102 ends.

Responsive to a determination that the drive root filesystem version does not match the firmware root filesystem version ("NO" branch 214), efficient booting system 102 mounts the firmware root filesystem (216), and proceeds as described above.

Figure 3:
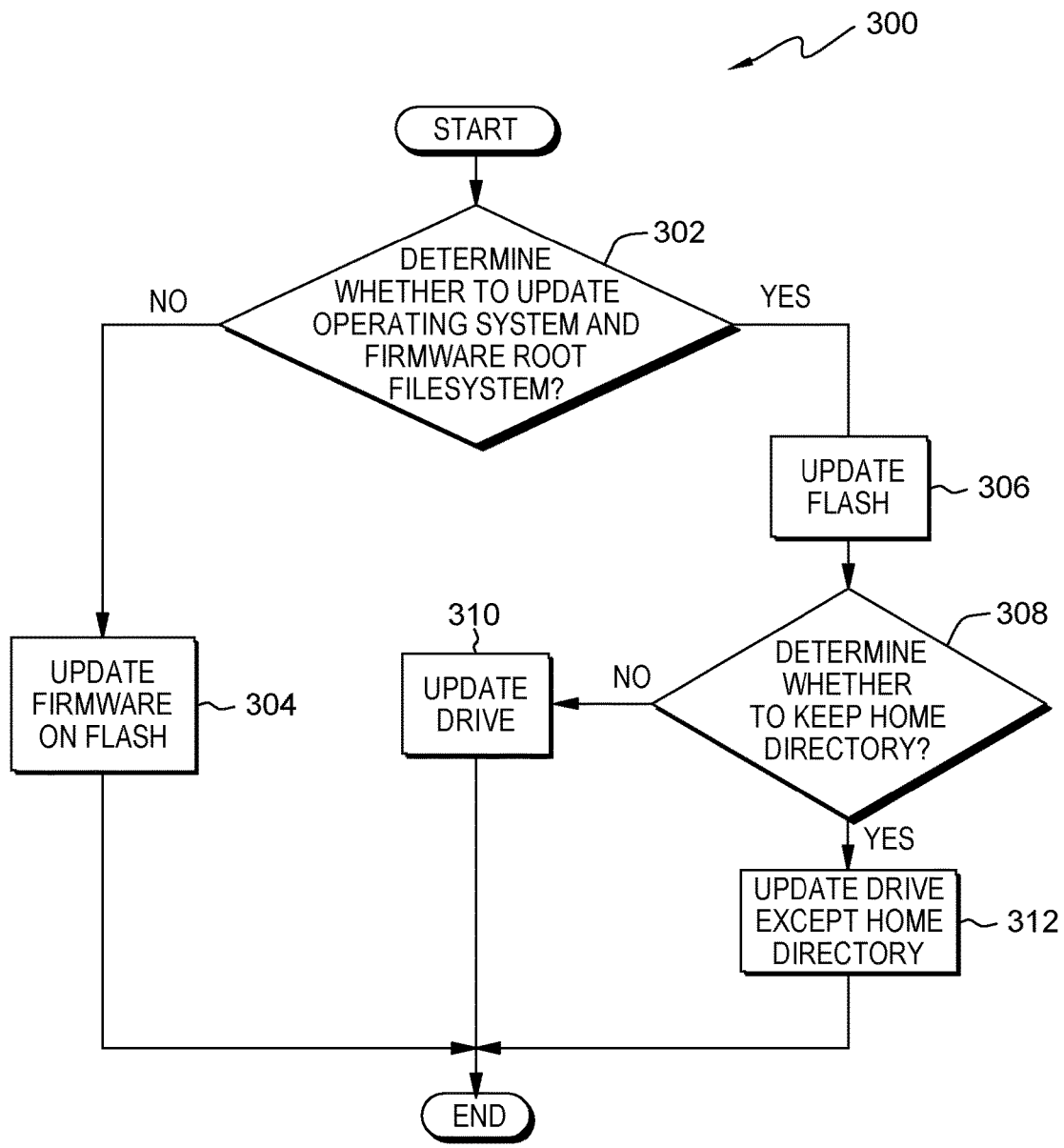
FIG. 3 is a flowchart depicting operational steps of an efficient booting system, such as the efficient booting system of FIG. 1, performing a firmware update in accordance with an embodiment of the present invention.

FIG. 3 is a flowchart, generally designated 300, depicting operational steps of efficient booting system 102 performing a firmware update in accordance with an embodiment of the present invention. The operational steps are in an order according to some embodiments. In other embodiments, the functions noted in the flowchart can occur out of the order noted in FIG. 3. Modifications to the depicted order may be made by those skilled in the art without departing from the scope of the invention as recited by the claims.

In some embodiments, efficient booting system 102 may perform a firmware update via a firmware update application. In other embodiments, the firmware update application may be stored on removable non-volatile media.

Efficient booting system 102 determines whether to update an operating system and a firmware root filesystem (302). In some embodiments, efficient booting system 102 may determine whether to update an operating system and a firmware root filesystem by loading program instructions without interaction by a user. Where the program instructions contain an instruction to update an operating system and root filesystem, efficient booting system 102 may determine to update the operating system and the firmware root filesystem. For example, efficient booting system 102 may be programed to update operating system 116 and firmware root filesystem 120 without interaction by a user.

In other embodiments, efficient booting system 102 may determine whether to update an operating system and a firmware root filesystem by prompting a user to choose whether to update an operating system and a firmware root filesystem. Where a user chooses to update an operating system and firmware root filesystem, efficient booting system 102 may determine to update the operating system and firmware root filesystem. For example, efficient booting system 102 may prompt a user to choose whether to update operating system 116 and firmware root filesystem 120, and receiving a confirmation response, efficient booting system 102 updates operating system 116 and firmware root filesystem 120.

Responsive to a determination that efficient booting system 102 is not to update the operating system and the firmware root filesystem ("NO" branch 302), efficient booting system 102 updates the firmware on a flash memory (304). Efficient booting system 102 may update the firmware on a flash memory by writing updated software data to the flash memory. For example, efficient booting system 102 may erase a previous firmware from flash 110 and write firmware 112 to flash 110.

Responsive to a determination that efficient booting system 102 is to update the operating system and the firmware root filesystem ("YES" branch 302), efficient booting system 102 updates flash with updated firmware, operating system, and firmware root filesystem (306). Efficient booting system 102 may update a flash, such as flash 110, by writing updated software data to the flash. For example, efficient booting system 102 may erase a previous firmware on flash 110, and efficient booting system 102 may write firmware 112, firmware signature 114, operating system 116, firmware root filesystem version 118, and firmware root filesystem 120 to flash 110.

Efficient booting system 102 determines whether to keep a home directory (308). In some embodiments, efficient booting system 102 may determine whether to keep a home directory of a drive by loading program instructions without interaction by a user. Where the program instructions contain an instruction to keep a home directory, firmware update application may determine to keep a home directory. For example, efficient booting system 102 could include program instructions to erase the home directory, containing user data, without user interaction.

In other embodiments, efficient booting system 102 may determine whether to keep a home directory of a drive by prompting a user to choose whether to keep the home directory. Where a user chooses to keep a home directory, efficient booting system 102 may determine to keep a home directory. For example, efficient booting system 102 could prompt a user with an option to keep the home directory, and efficient booting system 102 may determine to keep the home directory responsive to a user choosing to keep the home directory.

Responsive to a determination that a home directory is not to be kept ("NO" branch 308), efficient booting system 102 updates a drive (310). Efficient booting system 102 may update a drive by erasing part or all of the drive and writing software data to the drive. For example, efficient booting system 102 may erase all data on drive 130, and efficient booting system 102 may write drive signature 134, drive root filesystem version 138, and drive root filesystem 140 to drive 130.

Responsive to a determination that a home directory is to be kept ("YES" branch 308), efficient booting system 102 updates a drive except for the home directory (312). Efficient booting system 102 may update a drive except for the home directory by erasing part of the drive and writing software data to the drive. For example, efficient booting system 102 may erase a drive signature, version, and root filesystem, and efficient booting system 102 may write drive signature 134, drive root filesystem version 138, and drive root filesystem 140 to drive 130.

In some embodiments, efficient booting system 102 may restart the computer system and begin the operational steps of efficient booting system 102, as depicted in FIG. 2, after completing the update. In other embodiments, efficient booting system 102 may shutdown the computer system after completing the update.

Figure 4:
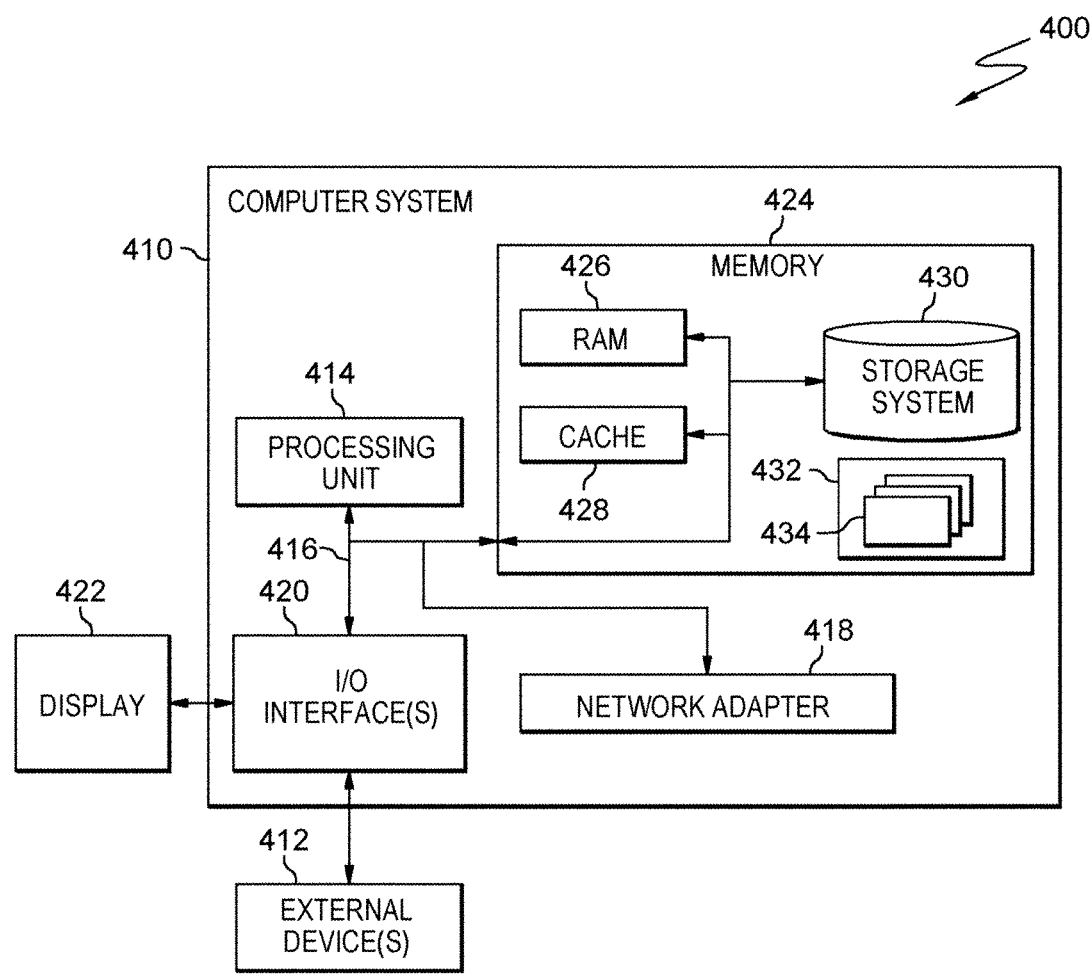
FIG. 4 depicts a block diagram of components of a computer capable of implementing an efficient booting system, such as the computer of FIG. 1, in accordance with an embodiment of the present invention.

FIG. 4 depicts a block diagram, generally designated 400, of components of a computer, such as computer 100, capable of implementing an efficient booting system, such as efficient booting system 102, in accordance with an embodiment of the present invention. It should be appreciated that FIG. 4 provides only an illustration of one implementation and does not imply any limitations with regard to the environments in that different embodiments may be implemented. Many modifications to the depicted environment may be made.

In some embodiments, efficient booting system 102 on computer 100 is shown in the form of a general-purpose computing device, such as computer system 410. The components of computer system 410 may include, but are not limited to, one or more processors or processing unit 414, memory 424, network adapter 418, Input/Output (I/O) interface(s) 420, and bus 416 that couples various system components including memory 424 to processing unit 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer-readable media. Such media may be any available media that is accessible by computer system 410, and it includes both volatile and non-volatile media, and may include removable and non-removable media.

Memory 424 can include computer-readable media in the form of volatile memory, such as random access memory (RAM) 426 and/or cache memory 428. Computer system 410 may further include other removable/non-removable, volatile/non-volatile computer system storage media, such as storage system 430. For example, storage system 430 may be a hard disk drive or solid state drive, providing non-volatile, persistent storage. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

By way of example, and not limitation program/utility 432, having one or more sets of program modules 434, may be stored in memory 424, along with an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external device(s) 412 such as a keyboard, a pointing device, external storage media, display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Additionally, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

As used herein, "application," "mobile application," or "app" encompasses application software that runs on (or is capable of running on) mobile devices and performs specific tasks for a user of the mobile device. In general, applications encompass any software file comprising instructions that can be understood and processed on a computing device, such as, for example, executable files, library modules, object files, script files, interpreter files, executable modules and the like. An application may be capable of being decompiled (decompiling is a process of translating a file, such as an executable file, containing information at a relatively low level of abstraction, such as assembly language, into a higher level of abstraction that may be human readable, such as programming languages like C++). Applications may include native applications (pre-installed on the mobile device by a vendor) such as address books, calendars, calculators, games, maps, and web browsers. Applications may also be downloaded from a plurality of application software distribution platforms via a network for execution on a mobile device, such as efficient booting system.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computer operated by the user, partly on the user-operated computer, as a stand-alone software package, partly on the user-operated computer and partly on a remote computer or entirely on the remote computer or server. In the latter scenario, the remote computer may be connected to the user-operated computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for efficient booting comprising:

loading a firmware into a memory from an integrated memory, wherein the integrated memory is a flash memory on a motherboard;

loading an operating system into the memory from the integrated memory;

determining whether a drive is blank;

responsive to a determination that the drive is blank, writing a drive root filesystem to the drive, wherein the drive root filesystem corresponds to a firmware root filesystem;

responsive to writing the drive root filesystem to the drive, writing a drive signature to the drive and writing a drive version to the drive;

responsive to writing the drive signature and the drive version to the drive, mounting the drive root filesystem from the drive; and mounting the firmware root filesystem from the integrated memory.

* * * * *